(12) United States Patent
Arora et al.

(10) Patent No.: US 11,100,687 B2
(45) Date of Patent: Aug. 24, 2021

(54) EMPHASIZING ON IMAGE PORTIONS IN PRESENTATIONS

(71) Applicant: Microsoft Technology Licensing, LLC, Redmond, WA (US)

(72) Inventors: Sahil Arora, Bellevue, WA (US); Virag Shah, Telangana (IN); Sandeep Kumar Srivastava, Telangana (IN); Tumu Sree Bharath, Telangana (IN); Kerry Young, San Jose, CA (US); Ravi Kant Rao, Telangana (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 460 days.

(21) Appl. No.: 15/292,862

(22) Filed: Oct. 13, 2016

(65) Prior Publication Data

US 2017/0220207 A1  Aug. 3, 2017

(30) Foreign Application Priority Data

Feb. 2, 2016  (IN) .............................. 201641003647

(51) Int. Cl.
*G06T 11/20* (2006.01)
*G06F 3/0484* (2013.01)
*G06T 11/60* (2006.01)
*G06F 3/0488* (2013.01)

(52) U.S. Cl.
CPC .......... *G06T 11/206* (2013.01); *G06F 3/0488* (2013.01); *G06F 3/04845* (2013.01); *G06T 11/60* (2013.01); *G06F 2203/04805* (2013.01)

(58) Field of Classification Search
CPC .... G06T 11/206; G06T 11/60; G06F 3/04845; G06F 3/0488; G06F 2203/04805
See application file for complete search history.

(56) References Cited

U.S. PATENT DOCUMENTS

| | | | |
|---|---|---|---|
| 6,766,331 B2 | 7/2004 | Shema et al. | |
| 6,931,603 B2 | 8/2005 | Boegelund | |
| 7,038,701 B2 | 5/2006 | Niemi | |
| 7,075,535 B2 | 7/2006 | Aguera y Arcas | |
| 7,383,495 B2 | 6/2008 | Dontcheva et al. | |
| 7,453,472 B2 | 11/2008 | Goede et al. | |
| 7,574,653 B2 | 8/2009 | Croney et al. | |
| 8,035,657 B2 * | 10/2011 | Vau | H04N 1/3871 345/629 |
| 8,296,675 B2 | 10/2012 | Falchuk | |
| 8,914,744 B2 | 12/2014 | Spencer et al. | |
| 9,152,305 B2 | 10/2015 | Xu et al. | |

(Continued)

FOREIGN PATENT DOCUMENTS

WO  2013057658 A1  4/2013

OTHER PUBLICATIONS

"PowerPoint Zoom In", Published on: Jan. 7, 2008 Available at: http://www.pptalchemy.co.uk/zoom.html.

(Continued)

*Primary Examiner* — Beau D Spratt
*Assistant Examiner* — Ashley M Fortino

(57) ABSTRACT

In an implementation, a presentation program includes a hotspot feature that allows a point in a slide to be designated as a hotspot. Supplemental content may then be associated with the hotspot such that, when the hotspot is invoked in a slide presentation, the supplemental content is surfaced.

20 Claims, 11 Drawing Sheets

(56) References Cited

U.S. PATENT DOCUMENTS

| | | | |
|---|---|---|---|
| 2004/0073873 A1 | 4/2004 | Croney et al. | |
| 2005/0010868 A1* | 1/2005 | Schowtka | G06T 11/60 |
| | | | 715/253 |
| 2007/0271503 A1 | 11/2007 | Harmon et al. | |
| 2009/0083710 A1* | 3/2009 | Best | G09B 5/00 |
| | | | 717/120 |
| 2010/0005408 A1 | 1/2010 | Lanahan et al. | |
| 2010/0223577 A1* | 9/2010 | Bennett | G06F 3/0481 |
| | | | 715/800 |
| 2013/0007579 A1 | 1/2013 | Dancy et al. | |
| 2013/0332068 A1 | 12/2013 | Kesar et al. | |
| 2014/0006491 A1* | 1/2014 | Hammer | G06Q 10/101 |
| | | | 709/204 |
| 2014/0053071 A1 | 2/2014 | Penner | |
| 2014/0282013 A1* | 9/2014 | Amijee | G06F 3/0482 |
| | | | 715/732 |
| 2014/0372943 A1 | 12/2014 | Kroupa et al. | |
| 2015/0277714 A1 | 10/2015 | Wang et al. | |

OTHER PUBLICATIONS

Anonymous, "Amazing PowerPoint Techniques Hints and Tips Hot Spot Zoom", Retrieved from <<http://web.archive.org/web/20160523210624/http://pptalchemy.co.uk/zoom.html>>, Jan. 19, 2018, 2 Pages.

"International Search Report and Written Opinion Issued in PCT Application No. PCT/US2017/055457", dated Jan. 29, 2018, 12 Pages.

"Office Action Issued in European Patent Application No. 17794812.2", dated Aug. 25, 2020, 7 Pages.

* cited by examiner

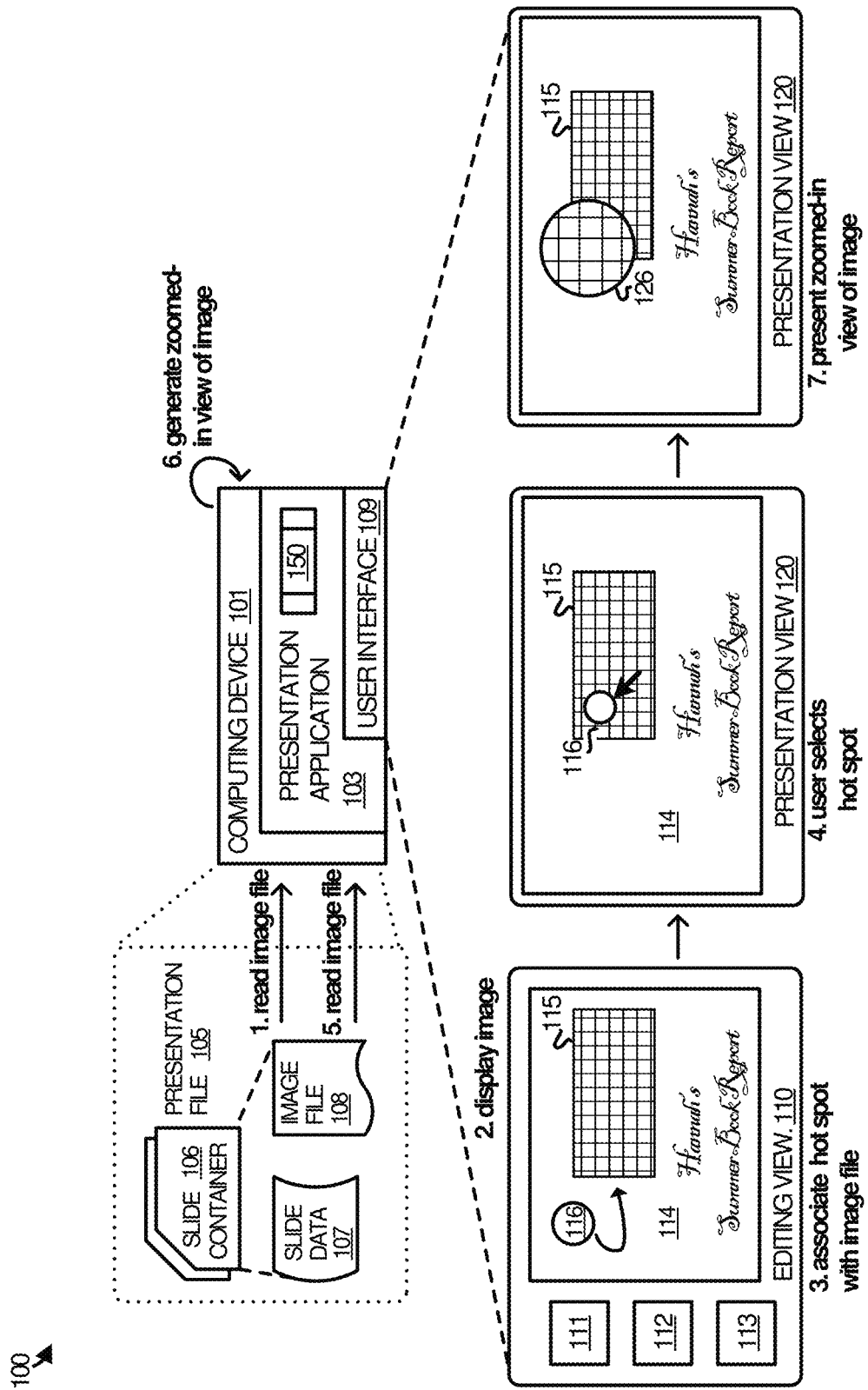

EMPHASIZING ON IMAGE PORTIONS IN PRESENTATIONS

TECHNICAL BACKGROUND

Presentation programs are software applications that allow end-users to create slide-based presentations. PowerPoint® from Microsoft®, Google® Slides, and Keynote® from Apple® are several examples of presentation programs that follow the slide-show model for presentations. Such programs are frequently provided in the context of a productivity software suite that includes other applications, such as word processing and spreadsheet applications, although stand-alone presentation programs are available.

Three basic components are usually present in the user interface to most presentation programs. A feature menu allows a user to add slides to his or her presentation, and then to interact with a given slide via a wide variety of features, functions, and tools. A preview panel displays a preview of all of the slides in a given presentation, which allows a user to navigate backward and forward in the presentation, add and delete slides, and reorder them. When a given slide is selected in the panel, its content is displayed on a full-size canvas and the end-user may edit the slide in the canvas.

Two basic modes are supported in presentation programs: an editing mode and a presentation mode. The feature menu, the side panel, and the canvas are rendered when in the editing mode, but typically are absent when in the presentation mode. Rather, the presentation mode provides a clean view of a presentation for consumption by an audience.

Some presentation programs provide a zoom-in feature that provides a zoomed-in view of a portion of an image in a slide. But the zoomed-in view is typically produced from the bitmap representation of the base image, resulting in a lower resolution relative to that of the base image. In addition, the zoomed-in view, which is stored as an image file itself, adds to the storage overhead of a given slide presentation, which already includes a source file for the base image in the slide.

OVERVIEW

Technology is disclosed herein that enhances the user experience with presentation programs and other operational aspects of such programs. In an implementation, a presentation program or other such productivity application includes a hotspot feature that allows a point in a slide to be designated as a hotspot. Supplemental content may then be associated with the hotspot such that, when the hotspot is invoked in a slide presentation, the supplemental content is surfaced.

In another implementation, a presentation application in an editing mode receives a designation of a portion of a base item in a presentation slide to be emphasized in a presentation mode. When in the presentation mode, the application may receive a selection of the portion of the base item designated for emphasis, in response to which it generates a supplemental item from a source of the base item. The supplemental item may comprise an emphasized version of the portion of the item designated for emphasis. The application presents the supplemental item in the presentation slide while in the presentation mode.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1C illustrates an operational scenario in an implementation.

TECHNICAL DISCLOSURE

Technology is disclosed herein for enhancing the digital presentation creation experience. In an implementation, a hotspot feature is provided in a user interface to a presentation program. A user can designate one or more points in a slide(s) as a hotspot. The user then associates supplemental content with the hotspot. When in presentation mode, the hotspot appears visually in the slide. A user can touch, click-on, or otherwise invoke the hotspot to trigger a rendering of the supplemental content. The supplemental content may be, for example, a zoomed-in image of a portion of the main content that the hotspot is nearby. The zoomed-in image of the portion of the main content is generated from the source of the main content, thereby preserving its resolution and conserving storage resources.

Figure 1A:
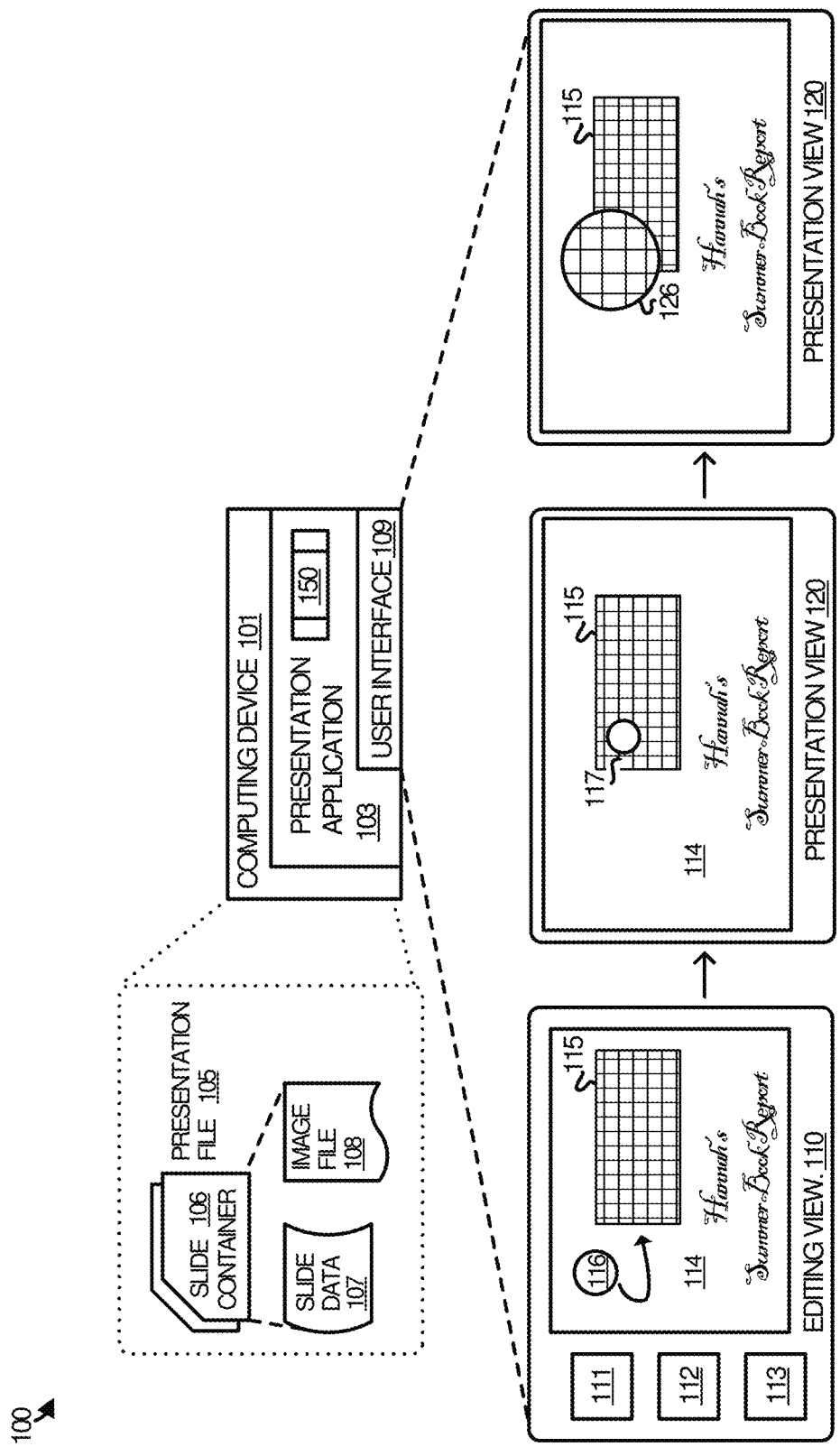
FIG. 1A illustrates an operational environment in an implementation of enhanced presentation technology.

FIG. 1 illustrates an operational environment 100 in an implementation of enhanced presentation technology. Operational environment 100 includes a computing system 101 on which a presentation application 103 may run. Computing system 101 may be, for example, a laptop or desktop computer, table computer, mobile phone, or any other physical or virtual computing system, of which computing system 201 in FIG. 2 is representative. Presentation application 103 is representative of any application suitable for creating presentations, examples of which include PowerPoint®, Google® Slides, Keynote® from Apple®, or any other productivity application.

Presentation application 103 renders a user interface 109 that a user may interact with in order to create, edit and experience slide presentations. Presentation application 103 may open a presentation file stored on computing system 101 (or stored remotely) for the user to edit and/or present in user interface 109. Presentation file 105 is exemplary of one such file.

Presentation file 105 includes one or more slide containers, represented by slide container 106. A slide container is a data structure that holds information used by presentation application 103 to present a digital slide in the context of a slide presentation. Slide container 106 includes, for example, slide data 107 and one or more image files, represented by image file 108. Image file 108 may be a .jpeg, .gif, .bmp, or any other format of image file that may be read and opened by presentation application 103 for rendering in user interface 109. Slide data 107 may include, for example, text strings, shape information, or any other such data and meta data.

When operating in an editing mode, presentation application 103 presents an editing view 110 in user interface 109 through which the user may edit a presentation. In this example, presentation application 103 generates a slide 114 from the contents of presentation file 105 and displays the slide 114 in user interface 109. Various previews of slide 114 and/or other slides may also be presented in editing view 110, represented by preview 111, and preview 112, and preview 113.

Slide 114 includes a text string that may be generated from the slide data 107 in slide container 106. Slide 114 also includes an image 115 generated from image file 108. Thus, image file 108 may be considered the source of image 115.

Editing view 110 also includes a designation tool 116 for designating a portion of an image in a slide for dynamic emphasis. The user may drag and drop or otherwise locate the designation tool 116 anywhere on image 115, such that the spot where it is located is designated for emphasis.

When presentation application 103 is operating in a presentation mode, a presentation view 120 of the slide 114 is presented. The presentation view 120 includes an indication 117 that an area on image 115 has been designated for emphasis. The user may thus select the indication 117 to trigger the presentation of a supplemental image 126. The supplemental image 126 is generated from image file 108 in response to the user selecting the indication 117.

Utilizing the same source file as that used to produce image 115 may have various technical effects. For example, supplemental image 126 may be rendered with the same or better resolution than image 115. In addition, only image file 108 need be stored on computing system 101, rather than having to store image file 108 and a supplemental file associated with supplemental image 126 (as would be the case in existing systems).

Figure 1B:
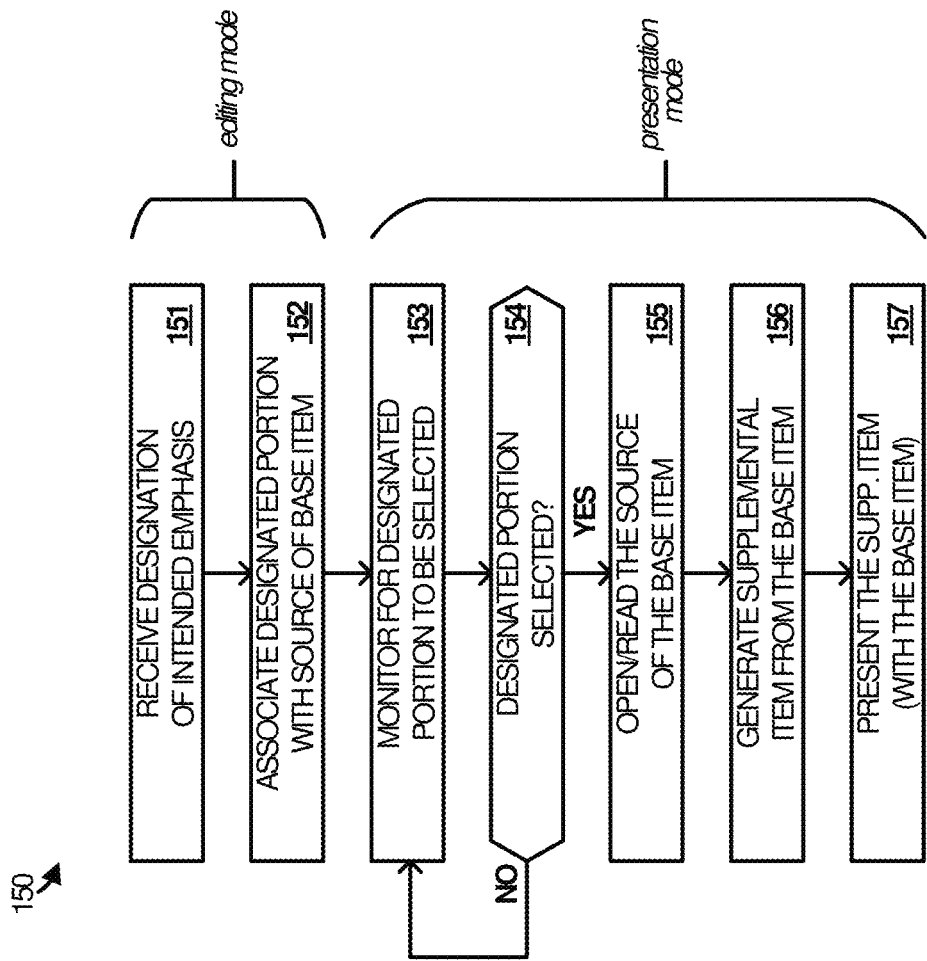
FIG. 1B illustrates a presentation process in an implementation.
Figure 2:
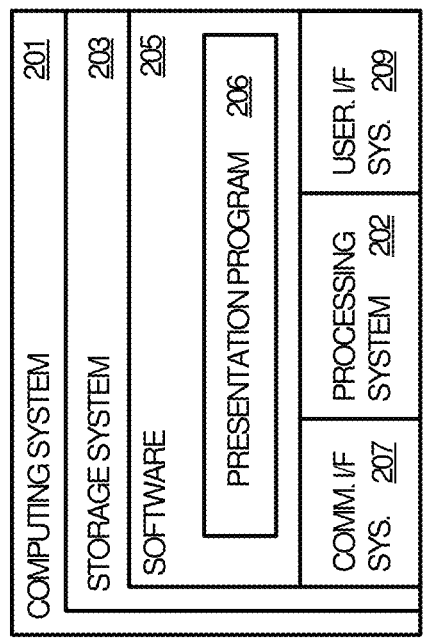
FIG. 2 illustrates a computing system suitable for implementing the enhanced presentation technology disclosed herein, including any of the architectures, elements, processes, and operational scenarios and sequences illustrated in the Figures and discussed below in the Technical Disclosure.

FIG. 1B illustrates a process 150 employed by presentation application 103 in the context of providing an enhanced presentation experience. Process 150 may be implemented in program instructions in the context of components, modules, or other such programming elements that comprise presentation application 103. The program instructions direct computing system 101 to operate as follows.

Referring parenthetically to the steps illustrated in FIG. 1B, a presentation application under the control of process 150 receives a designation of an area in a base item intended for emphasis (step 151) while the operating in an editing mode. This may involve a user dragging and dropping a graphical user interface element onto a location in a base item image within the context of a presentation slide. Other examples include the user drawing a circle around an area using a mouse input, a digital pen, a stylus, or touch. Still other examples include providing a spoken command to locate an emphasis designation. Examples of a base item include images, charts, graphs, clip art, video, or any other type of content that may be included in a slide.

The presentation program responsively associates the designated portion of the base item with the source of the base item (step 152), to allow the designated portion to be emphasized when the slide is viewed in a presentation mode. When operating in the presentation mode, the presentation program monitors the user's interaction with the slide for any selection of the designated portion (step 153). The user may, for example, click on, touch, or otherwise select the designated portion for emphasized viewing. If the user selects the designated portion (step 154), the presentation program opens the source of the base item and reads it into memory anew (step 155). The presentation program then generates a supplemental item from the source of the base item (step 156) and displays the supplemental item in the user interface, along with the base item (step 157).

FIG. 1C illustrates an operational scenario that may occur in the context of operational environment 100 when presentation application 103 executes process 150. In operation, presentation application 103 reads presentation file 105 from disk in order to render slide 114 in user interface 109. Rendering the slide includes displaying image 115 which is generated from image file 108 read from disk.

The end-user may then interact with designation tool 116 to identify a portion of image 115 to be designated for emphasis. Such a designated area may be referred to as a "hot spot" in some scenarios. The hot spot is associated with the image file, such that, when the user selects the hot spot in presentation mode, presentation program 103 knows to access image file 108 in order to generate a zoomed-in version of image 115. Thus, image file 108 is again read from disk (or memory) and the zoomed-in view of the image is generated. Presentation application 103 may then present the zoomed-in view 126 of image 115 in an overlaid manner with respect to image 115.

FIG. 2 illustrates computing system 201, which is representative of any computing system capable of employing a presentation program. Computing system 201 may be suitable for rendering user interface 300, discussed with respect to FIGS. 3A-3F.

FIGS. 3A-3F illustrate a user interface to a presentation program as the user interface transitions through various states in response to user inputs. The various states illustrated in the drawings represent the new features and functionality proposed herein to enhance presentation technology.

Figure 3A:
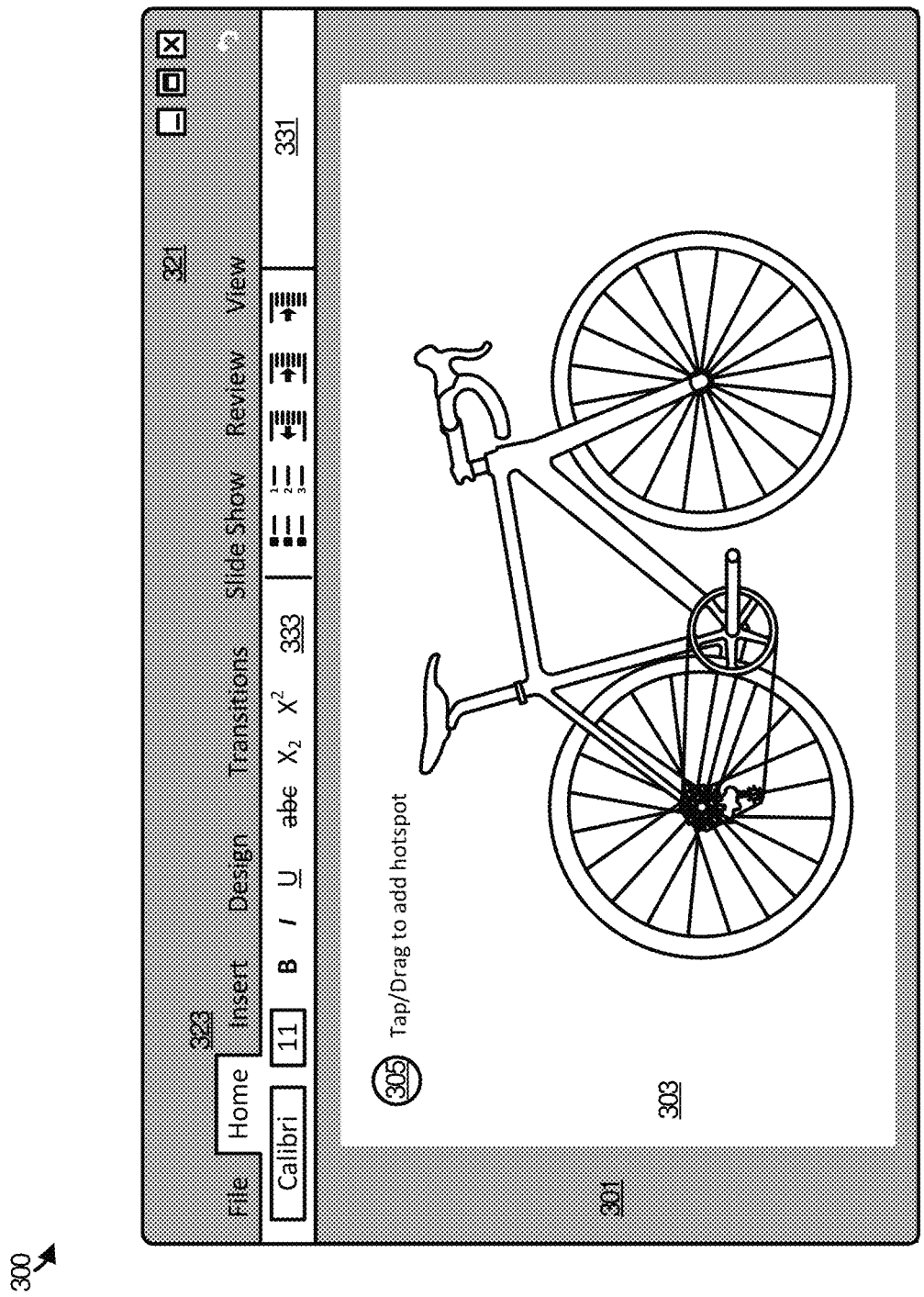
FIGS. 3A-3G illustrate an operational scenario in an implementation.

In FIG. 3A, user interface 300 includes a slide 301. The slide 301 includes a canvas 303 onto which a user may deposit text, images, and other suitable content in the context of developing a digital slide presentation. User interface 300 may include other elements, such as a layout panel that may include previews of slide 301 in various layouts. A preview panel may also be available in some implementations that includes a preview of each slide in the presentation.

User interface 300 also includes a feature menu 321 with sub-menus 323 that house various features and tools for interacting with a presentation. For example, feature menu 321 includes the home, insert, design, transitions, slide show, review, and view sub-menus. When a given sub-menu is selected, its options and elements are displayed in a ribbon tool bar 331. The tools presented in the ribbon tool bar 331 represent the various features and functionality associated with the sub-menu. In this example, the home sub-menu 333 is selected, which surfaces various home tools, such as a new slide too, a layout tool, and a formatting tool.

Figure 3B:
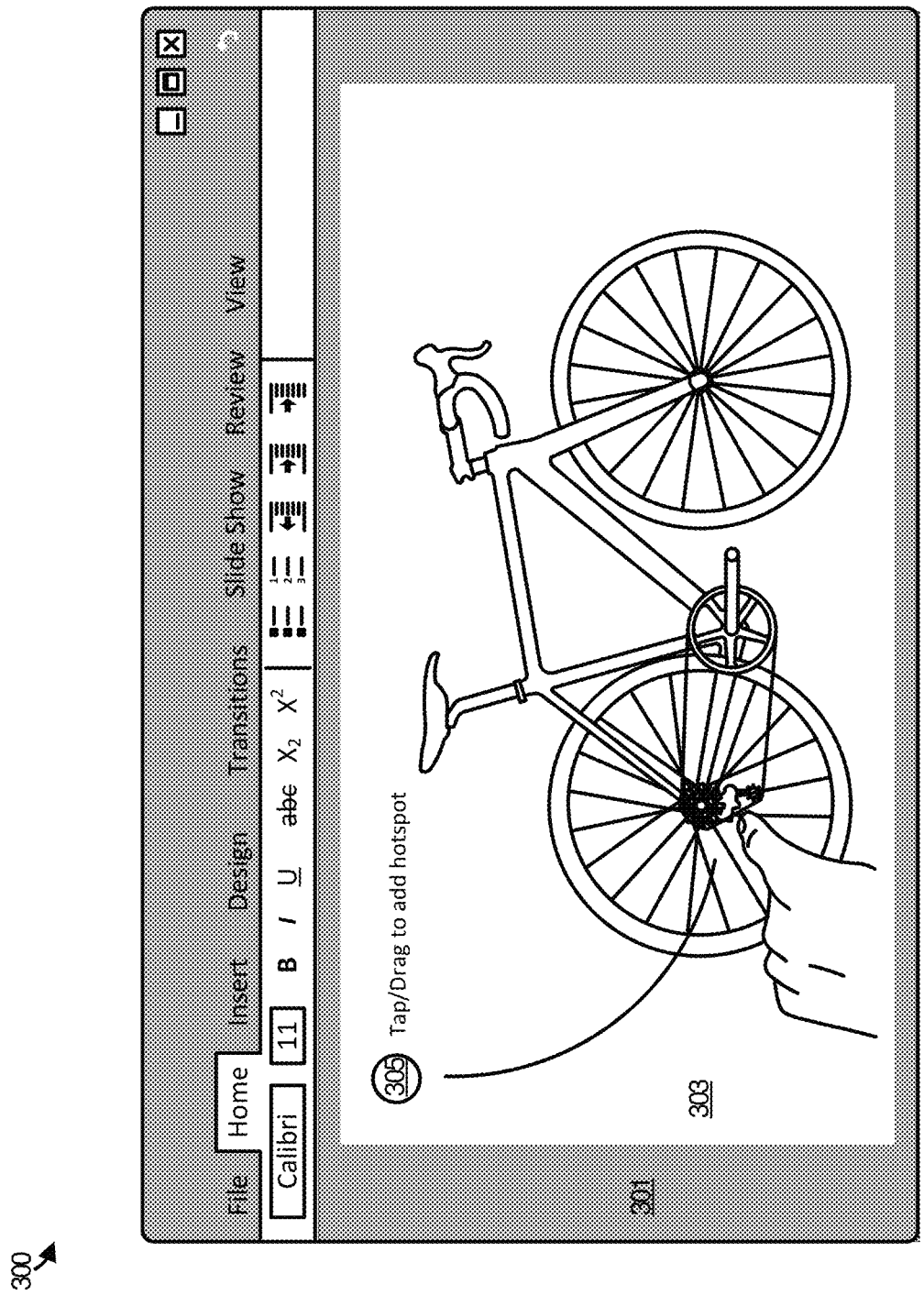
Figure 3C:
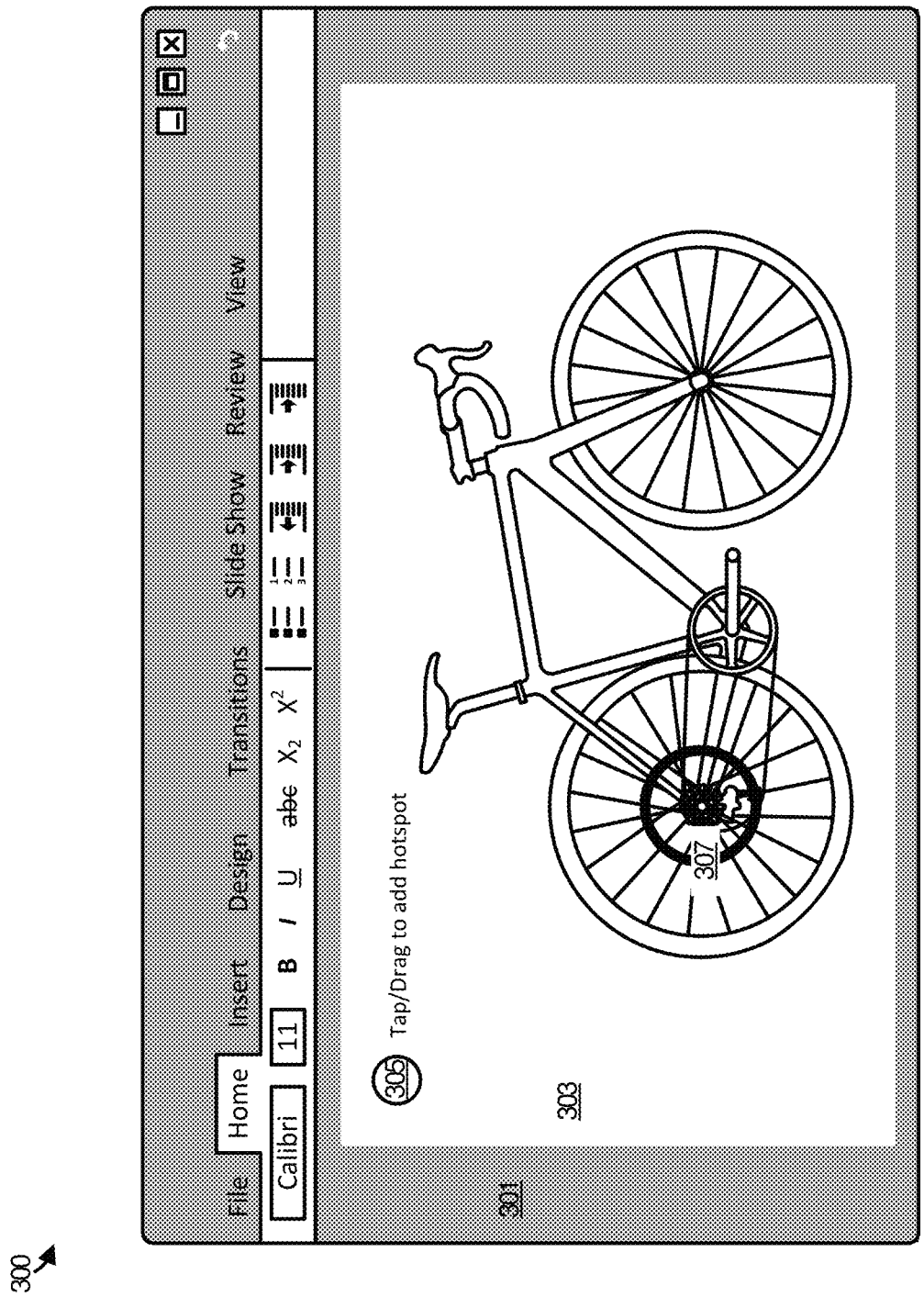

A hotspot element 305 may be rendered in the slide (or elsewhere) that, when in editing mode, allows a user to create a hotspot merely by touching/selecting the hotspot element 305. The user can drag and drop the hotspot element 305 to a point in the slide where he or she wants to create a hotspot. In FIG. 3B, the hotspot element 305 is dragged and dropped to a point in the slide nearby the hub and spoke of the back wheel of the bicycle in the image. The size of resulting hotspot 307 may be adjusted by pinching and zooming as shown in FIG. 3C.

Figure 3D:
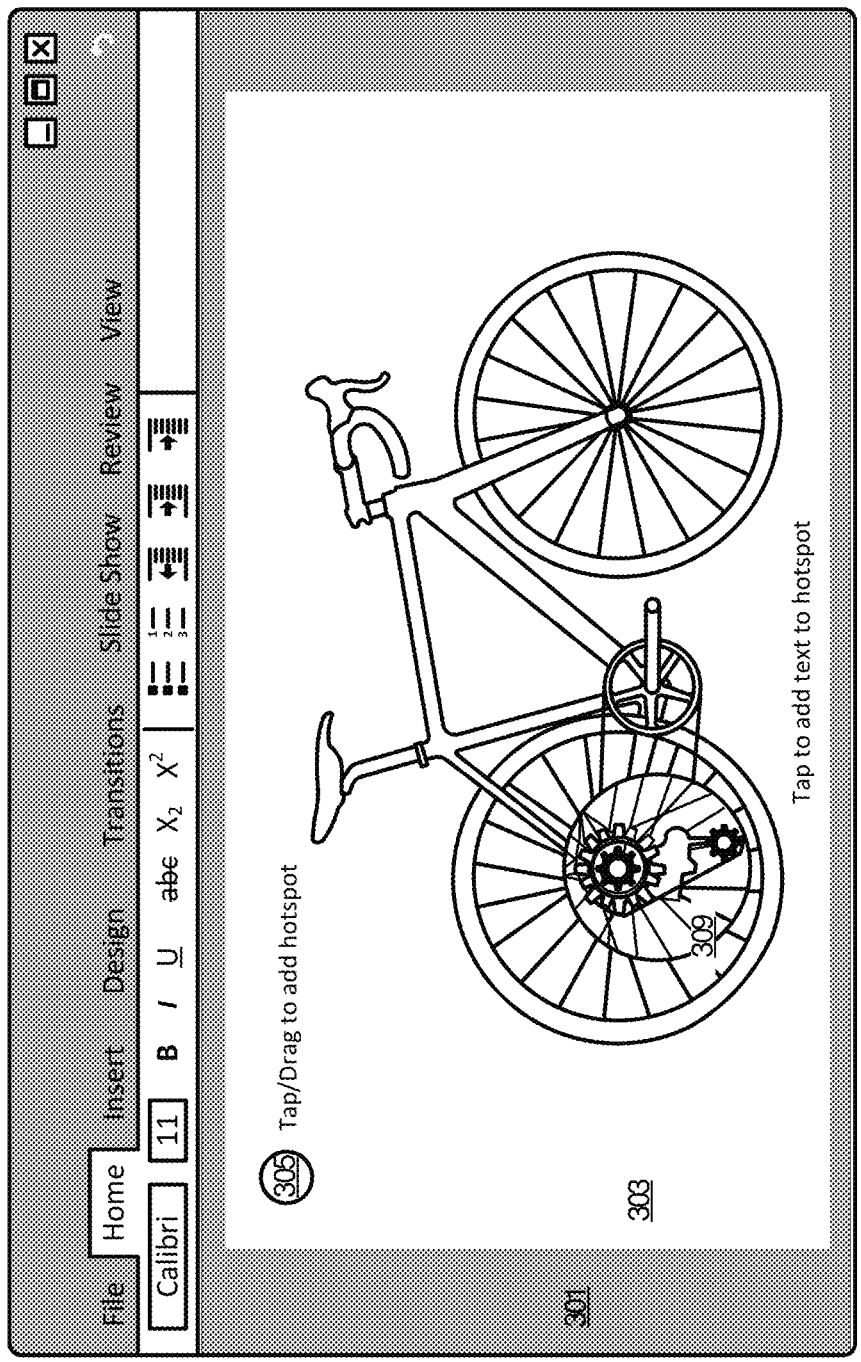

In FIG. 3D, supplemental content is shown in association with the resulting hotspot 307. The supplemental content 309 may be generated from the main content that it overlays. For example, the supplemental content may be a zoomed-in portion of an image over which the resulting hotspot 307 is presented. In other cases, the supplemental content 309 may be a second image, such as another image provided by the user, for example, to show a more detailed view. A text box (not shown) may be further associated with the resulting hotspot 307 to describe what is being shown.

Figure 3E:
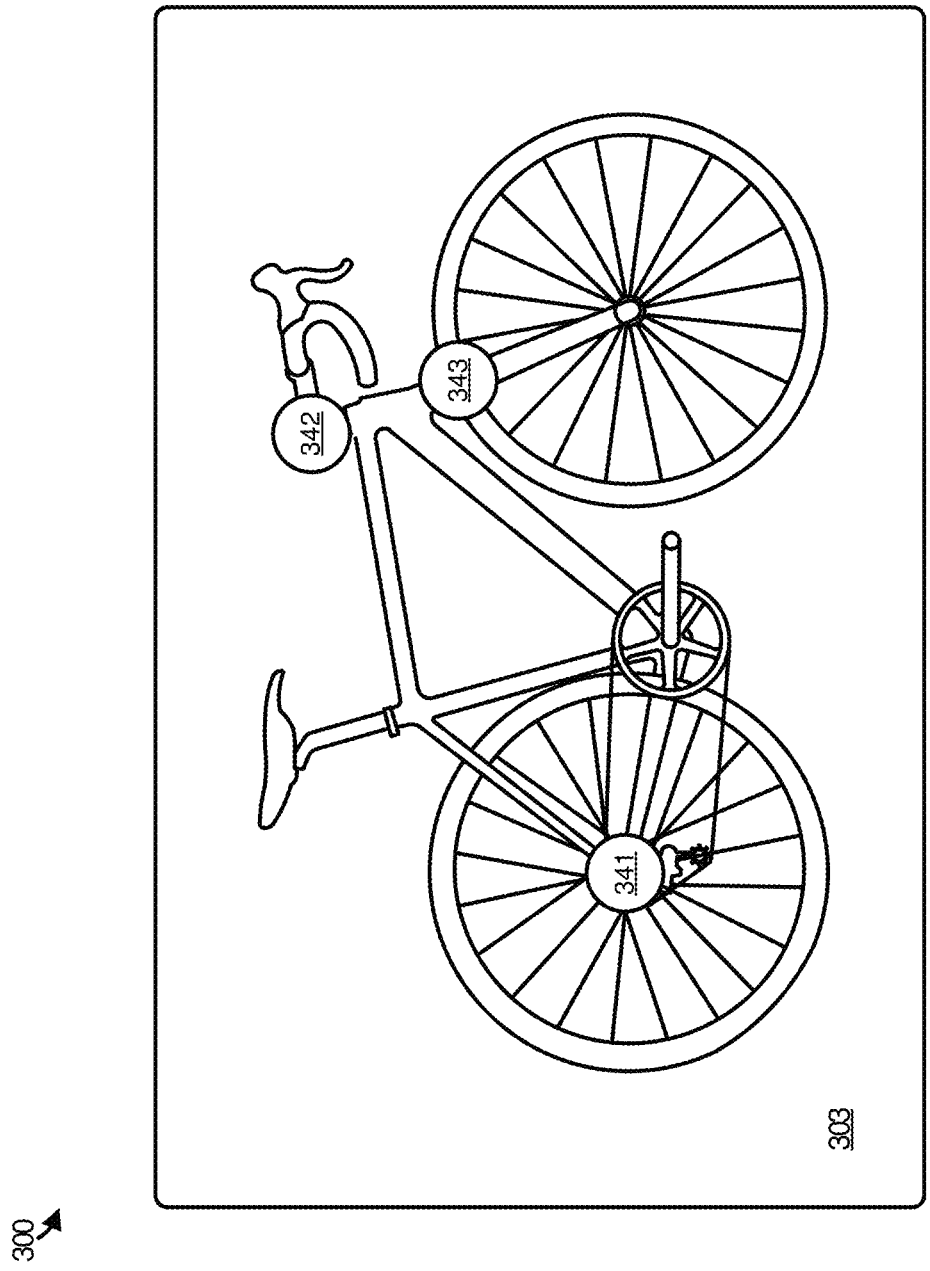
Figure 3F:
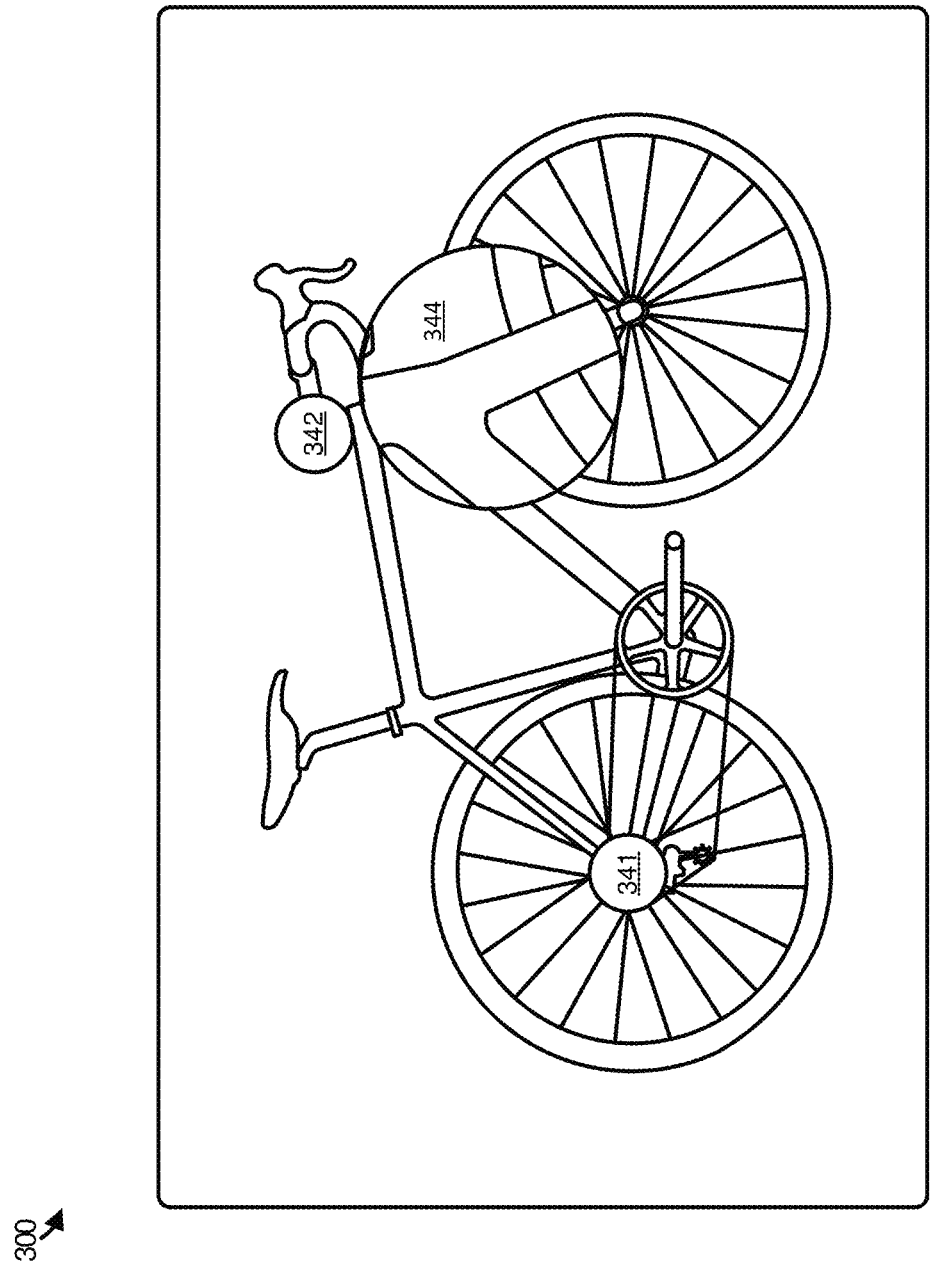
Figure 3G:
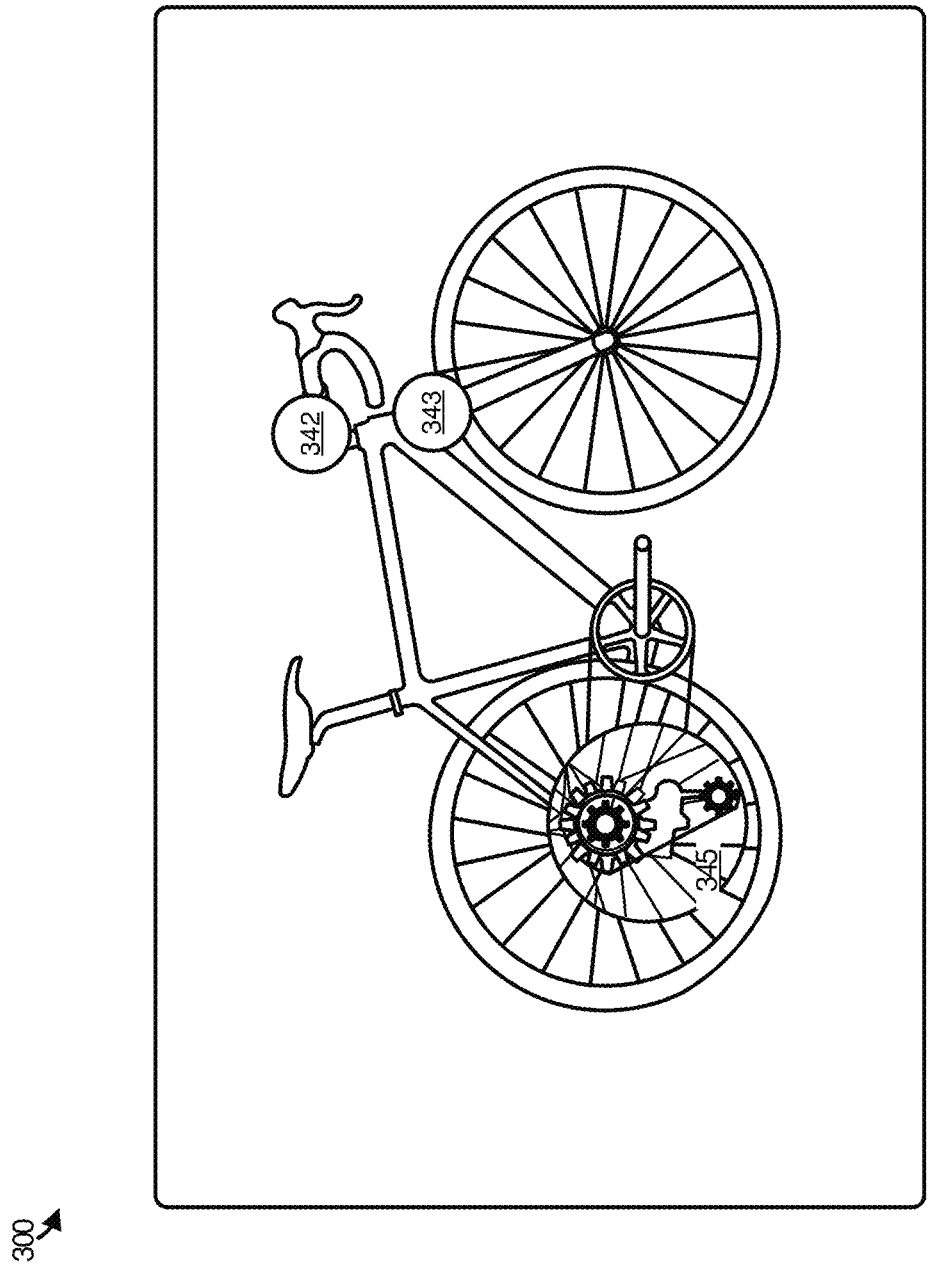

FIG. 3E illustrates the slide 301 in presentation mode. The slide 301 in presentation mode includes three hotspots for exemplary purposes: hotspot 341 (created above), hotspot 342, and hotspot 343. A user can select any of the hotpots in order to see their associated supplemental content. For example, in FIG. 3F hotspot 343 is selected, which provides a zoomed-in view 344 of a portion of the bike. A text box may also be surfaced that provides explanatory text to go along with the zoomed-in image. In FIG. 3G, hotspot 341 is selected, which provides a zoomed-in view of the gears. A text box may be included that provides a textual explanation to accompany the supplemental content.

In some implementations, the supplemental content associated with a hotspot may be surfaced automatically. For instance, when a user navigates to a slide with a hotspot in it, the supplemental content behind the hotspot may be surface automatically after a predetermined (or set) period of time, e.g. after 5 or 10 seconds. When multiple hotspots are present, the supplemental content behind each hotspot may be surfaced automatically and in series. For instance, one hotspot may be zoomed-in on for a period of time, then closed, followed by another hotspot, and so on. Other user inputs, in addition to or in place or selecting a hotspot, may also trigger a hotspot to be zoomed-in on. For instance, hovering over a hotspot trigger its supplemental content to be surfaced. In another example, a separate control element (e.g. a button) may be selected that triggers the supplemental content.

Referring back to FIG. 2, computing system 201 is representative of any system or collection of systems in which the various applications, services, scenarios, and processes disclosed herein may be implemented. Examples of computing system 201 include smart phones, laptop computers, tablet computers, desktop computers, hybrid computers, gaming machines, virtual reality devices, smart televisions, smart watches and other wearable devices, as well as any variation or combination thereof. Other examples may include, but are not limited to, server computers, rack servers, web servers, cloud computing platforms, and data center equipment, as well as any other type of physical or virtual server machine, container, and any variation or combination thereof.

Computing system 201 may be implemented as a single apparatus, system, or device or may be implemented in a distributed manner as multiple apparatuses, systems, or devices. Computing system 201 includes, but is not limited to, processing system 202, storage system 203, software 205, communication interface system 207, and user interface system 209. Processing system 202 is operatively coupled with storage system 203, communication interface system 207, and user interface system 209.

Processing system 202 loads and executes software 205 from storage system 203. Software 205 includes presentation program 206, which is representative of the program(s) discussed with respect to the preceding Figures. When executed by processing system 202 to enhance document presentations, software 205 directs processing system 202 to operate as described herein for at least the various processes, operational scenarios, and sequences discussed in the foregoing implementations. Computing system 201 may optionally include additional devices, features, or functionality not discussed for purposes of brevity.

Referring still to FIG. 2, processing system 202 may comprise a micro-processor and other circuitry that retrieves and executes software 205 from storage system 203. Processing system 202 may be implemented within a single processing device, but may also be distributed across multiple processing devices or sub-systems that cooperate in executing program instructions. Examples of processing system 202 include general purpose central processing units, application specific processors, and logic devices, as well as any other type of processing device, combinations, or variations thereof.

Storage system 203 may comprise any computer readable storage media readable by processing system 202 and capable of storing software 205. Storage system 203 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 203 may also include computer readable communication media over which at least some of software 205 may be communicated internally or externally. Storage system 203 may be implemented as a single storage device, but may also be implemented across multiple storage devices or sub-systems co-located or distributed relative to each other. Storage system 203 may comprise additional elements, such as a controller, capable of communicating with processing system 202 or possibly other systems.

Software 205 may be implemented in program instructions and among other functions may, when executed by processing system 202, direct processing system 202 to operate as described with respect to the various operational scenarios, sequences, and processes illustrated herein. For example, software 205 may include program instructions for implementing state transitions in a user interface to a presentation program.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 205 may include additional processes, programs, or components, such as operating system software, virtual machine software, or other application software, in addition to or that include presentation program 206. Software 205 may also comprise firmware or some other form of machine-readable processing instructions executable by processing system 202.

In general, software 205 may, when loaded into processing system 202 and executed, transform a suitable apparatus, system, or device (of which computing system 201 is representative) overall from a general-purpose computing system into a special-purpose computing system customized to facilitate enhanced presentation creation and editing. Indeed, encoding software 205 on storage system 203 may transform the physical structure of storage system 203. The specific transformation of the physical structure may depend on various factors in different implementations of this description. Examples of such factors may include, but are not limited to, the technology used to implement the storage media of storage system 203 and whether the computer-storage media are characterized as primary or secondary storage, as well as other factors.

For example, if the computer readable storage media are implemented as semiconductor-based memory, software 205 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 207 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 209 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 209. In some cases, the input and output devices may be combined in a single device, such as a display capable of displaying images and receiving touch gestures. The aforementioned user input and output devices are well known in the art and need not be discussed at length here.

User interface system 209 may also include associated user interface software executable by processing system 202 in support of the various user input and output devices discussed above. Separately or in conjunction with each other and other hardware and software elements, the user interface software and user interface devices may support a graphical user interface, a natural user interface, or any other type of user interface to present a user interface to a presentation program as discussed herein (e.g. user interface 109).

Communication between computing system 201 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A computing apparatus comprising:
   one or more computer readable storage media;
   a processing system operatively coupled with the one or more computer readable storage media; and
   a presentation program comprising program instructions stored on the one or more computer readable storage media that, when read and executed by the processing system, direct the computing apparatus to at least:
   open a presentation file on the computing apparatus, wherein the presentation file comprises a slide container that includes slide data and an image file;
   in an editing mode and on the computing apparatus:
   display a slide that includes an image produced from the image file; receive a hotspot designation of only a portion of the image rendered on the slide; and associate the hotspot designation with the image file located in the slide container; and in a presentation mode and on the computing apparatus: display the slide including the image produced from the image file; receive input while in the presentation mode that comprises a selection of the portion of the image associated with the hotspot designation, in response to the user input read a portion of the image file in memory and generate a zoomed-in version of the image from the portion of the image file read from the memory, and display the zoomed-in version of the image in the slide.

2. The computing apparatus of claim 1 wherein the program instructions further direct the computing apparatus to monitor for the selection of the portion of the image associated with the hotspot designation.

3. The computing apparatus of claim 1 wherein
the user input comprises a touch gesture.

4. The computing apparatus of claim 1 wherein the program instructions further direct the computing apparatus to present, in conjunction with the zoomed-in version of the image, text associated with the zoomed-in version of the image.

5. The computing apparatus of claim 1 wherein a resolution of the zoomed-in version of the image is equal to or greater than a resolution of the image.

6. The computing apparatus of claim 1 wherein the image comprises a scene captured by a digital camera.

7. The computing apparatus of claim 1 wherein the image comprises a chart produced by a productivity application.

8. A method of operating a presentation application on a computing device, the method comprising:
in an editing mode and on the computing device, rendering a slide of the presentation application based at least on a slide container associated with the slide, wherein the slide container includes an image file and the slide includes an image produced from the image file;
in the editing mode and on the computing device, receiving a hotspot designation of only a portion of the image displayed on the slide;
in the editing mode and on the computing device, associating the hotspot designation with the image file located in the slide container;
in a presentation mode and on the computing device, rendering the slide based at least on the slide container associated with the slide, wherein the slide includes the image produced from the image file;
in the presentation mode and on the computing device, and in response to a selection of the portion of the image associated with the hotspot designation, rendering a zoomed-in version of the image by at least: reading at least a portion of the image file in memory and generating the zoomed-in version of the image from at least the portion of the image file read from the memory; and
in the presentation mode and on the computing device, displaying the zoomed-in version of the image in the slide.

9. The method of claim 8 further comprising monitoring for the selection of the portion of the image associated with the hotspot designation.

10. The method of claim 8 wherein
the selection comprises a touch gesture.

11. The method of claim 8 further comprising presenting, in conjunction with presentation of the zoomed-in version of the image, text associated with the zoomed-in version of the image.

12. The method of claim 8 wherein a resolution of the zoomed-in version of the image is equal to or greater than a resolution of the image.

13. The method of claim 8 wherein the image comprises a scene captured by a digital camera.

14. The method of claim 8 wherein the image comprises a chart produced by a productivity application.

15. One or more non-transitory computer readable storage media having stored thereon program instructions that, when read and executed by a processing system, direct a computing device to at least:
in an editing mode and on the computing device, render a slide of a presentation program based at least on a slide container, wherein the slide container includes an image file and the slide includes an image produced from the image file;
in the editing mode and on the computing device, associate a hotspot with a portion oft he image rendered on the slide;
in a presentation mode and on the computing device, render the slide based at least on the slide container associated with the slide, wherein the slide includes the image produced from the image file;
in the presentation mode and on the computing device, present the hotspot in the slide;
when the hotspot is invoked and the presentation program is in the presentation mode and on the computing device, autonomously render, in memory from the image file, a zoomed-in version of the image by at least: reading at least a portion of the image file in the memory and generating the zoomed-in version of the image from at least the portion of the image file read from the memory; and
in the presentation mode and on the computing device, present, in the slide, the zoomed-in version of the image.

16. The one or more non-transitory computer readable storage media of claim 15 wherein the program instructions further direct the computing device to monitor for an invocation of the hotspot.

17. The one or more non-transitory computer readable storage media of claim 15 wherein
the invocation of the hotspot comprises a touch gesture.

18. The one or more non-transitory computer readable storage media of claim 17 wherein the program instructions direct the computing device to present, in conjunction with presentation of the zoomed-in version of the image, text associated with the zoomed-in version of the image.

19. The one or more non-transitory computer readable storage media of claim 15 wherein a resolution of the zoomed-in version of the image is equal to or greater than a resolution of the image.

20. The one or more non-transitory computer readable storage media of claim 15 wherein to present the zoomed-in version of the image in the slide, the program instructions direct the computing device to present the zoomed-in version of the image in an overlaid manner with respect to the image.

* * * * *